(12) United States Patent
Perraut et al.

(10) Patent No.: US 10,252,650 B2
(45) Date of Patent: Apr. 9, 2019

(54) VEHICLE SEAT WITH THERMAL COMFORT SYSTEM

(71) Applicant: Faurecia Automotive Seating, LLC, Troy, MI (US)

(72) Inventors: John Michael Perraut, Rochester Hills, MI (US); Jeffery Bonk, Chesterfield, MI (US); Raghvendra Trimbakrao Joshi, Windsor (CA)

(*) Notice: Subject to any disclaimer, the term of this patent is extended or adjusted under 35 U.S.C. 154(b) by 453 days.

(21) Appl. No.: 14/771,084

(22) PCT Filed: Mar. 17, 2014

(86) PCT No.: PCT/US2014/030347
§ 371 (c)(1),
(2) Date: Aug. 27, 2015

(87) PCT Pub. No.: WO2014/145556
PCT Pub. Date: Sep. 18, 2014

(65) Prior Publication Data
US 2016/0009206 A1    Jan. 14, 2016

Related U.S. Application Data

(60) Provisional application No. 61/801,458, filed on Mar. 15, 2013.

(51) Int. Cl.
    *B60N 2/56*    (2006.01)
(52) U.S. Cl.
    CPC .......... *B60N 2/5628* (2013.01); *B60N 2/565* (2013.01); *B60N 2/5635* (2013.01);
    (Continued)

(58) Field of Classification Search
    CPC .... B60N 2/5628; B60N 2/5642; B60N 2/565; B60N 2/5657; B60N 2/5678; B60N 2/5692
    See application file for complete search history.

(56) References Cited

U.S. PATENT DOCUMENTS 5,626,021 A    5/1997  Karunasiri et al.
7,607,739 B2*  10/2009 Browne ............... B60N 2/5621
                                                    297/180.1 X
(Continued)

FOREIGN PATENT DOCUMENTS

WO    2012013124 A1    2/2012
WO    2012056303 A1    5/2012

OTHER PUBLICATIONS

International Search Report for application No. PCT/US2014/030347, dated Jul. 11, 2014, 4 pages.

*Primary Examiner* — Anthony D Barfield
(74) *Attorney, Agent, or Firm* — Reising Ethington P.C.

(57) ABSTRACT

A thermal comfort system for use with a vehicle seat includes an airflow management system and a thermal-electric device (TED) system. The TED system operates to conduct thermal energy between the seat occupant and the vehicle seat to enhance the thermal comfort of the seat occupant. The airflow management system operates to route a stream of conditioned air along the body of the seat occupant via cooperating air intake and air discharge ports to further enhance the comfort of the seat occupant. The conditioned air may also be routed along the TED system to enhance TED performance. The HVAC system of the vehicle can provide the conditioned air and/or a non-ambient pressure source that induces air flow along one or more portions of the thermal comfort system.

20 Claims, 6 Drawing Sheets

(52) U.S. Cl.
CPC ......... B60N 2/5642 (2013.01); B60N 2/5657 (2013.01); B60N 2/5678 (2013.01); B60N 2/5692 (2013.01)

(56) References Cited

U.S. PATENT DOCUMENTS

| 9,320,361 | B2* | 4/2016 | Gaines |
| 2005/0066505 | A1 | 3/2005 | Iqbal et al. |
| 2006/0087160 | A1* | 4/2006 | Dong ........................ A47C 7/72 |
| | | | 297/180.13 |
| 2010/0327637 | A1 | 12/2010 | Bajic et al. |
| 2014/0090829 | A1* | 4/2014 | Petrovski ...................... 165/203 |
| 2017/0164757 | A1* | 6/2017 | Thomas ................. A47C 21/04 |

* cited by examiner

VEHICLE SEAT WITH THERMAL COMFORT SYSTEM

TECHNICAL FIELD

The present disclosure relates generally to vehicle seat assemblies and, in particular, to seat assemblies including features for managing the thermal comfort of a seated occupant.

BACKGROUND

Heating, ventilation and air-conditioning (HVAC) systems have long been used in vehicles to help manage the thermal comfort of vehicle occupants, among other things. Such systems often employ convective heat transfer, where warm or cool air is made to flow within the vehicle cabin to affect the average temperature inside the cabin according to the desire of the occupants. Thermal elements have also been employed in vehicle seats to manage occupant comfort. For example, electrically heated seats include thermal elements than can conduct heat through seating surfaces when a seated passenger desires a warmer seating surface. In general, HVAC systems and seat-integrated thermal elements have developed separately with improvements typically focused on increased performance and/or efficiencies, ease of manufacturing or cost reduction of the independently operated and controlled components.

SUMMARY

In accordance with at least one embodiment, a vehicle seat includes a seat bottom and a seat back coupled together. Each of the seat bottom and seat back has a seating surface that makes contact with a seat occupant. The vehicle seat includes at least one air flow port and a thermal-electric device (TED). The air flow port(s) is adapted for fluid connection with a non-ambient pressure source that induces air flow through the port and along the body of the seat occupant. The TED is arranged to conduct thermal energy to or from the seat occupant at the seating surface(s).

At least one embodiment of the vehicle seat includes an internal air flow channel, and at least one air flow port is an air intake port adapted for fluid connection with a negative pressure source that induces air flow from the vehicle cabin and along the internal air flow channel via the air intake port.

At least one embodiment of the vehicle seat includes a heat transfer station in communication with the TED, and at least one air flow port is in fluid communication with the heat transfer station.

At least one embodiment of the vehicle seat includes at least one air flow port that is an air intake port adapted for fluid connection with a negative pressure source that induces air flow along the heat transfer station.

At least one embodiment of the vehicle seat includes a non-ambient pressure source provided by a vehicle HVAC system.

At least one embodiment of the vehicle seat includes a non-ambient pressure source provided by a TED system.

At least one embodiment of the vehicle seat includes a blower that provides the non-ambient pressure source.

At least one embodiment of the vehicle seat includes a valve operable to allow or prevent air flow through at least one air flow port when another air flow port is at least partially blocked.

At least one embodiment of the vehicle seat includes a TED portion in thermal communication with a layer of air-permeable material within the seat back or the seat bottom or both. The air-permeable material is in fluid communication with the non-ambient pressure source.

In accordance with at least one embodiment, a thermal comfort system for use with a vehicle seat includes an airflow management system and a TED system. The airflow management system is arranged to discharge air from the vehicle seat and along the body of a seat occupant. Characteristics of the discharged air are changeable according to user input. The TED system includes a TED and is arranged to conduct thermal energy between the vehicle seat and the seat occupant.

At least one embodiment of the thermal comfort system includes a common non-ambient pressure source that induces air flow along at least a portion of both of the airflow management system and the TED system during operation.

At least one embodiment of the thermal comfort system has the TED located so that air flows along the TED during operation.

At least one embodiment of the thermal comfort system includes a controller and a user interface. The controller is in communication with at least one component of both of the airflow management system and the TED system. The user interface is in communication with the controller and operable to receive user input that affects operating characteristics of both of the airflow management system and the TED system.

At least one embodiment of the thermal comfort system provides for conditioned air to be supplied to the vehicle seat from a vehicle HVAC system.

At least one embodiment of the thermal comfort system provides for air from the vehicle seat to be supplied to a vehicle HVAC system along a recirculation path.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

As will be apparent from the following disclosure, a vehicle seat 10 can be configured to integrate convective occupant climate control with conductive thermal elements as part of an occupant thermal comfort system 12. Convective and conductive elements can be combined in a complimentary manner that not only improves energy efficiency when compared to separately operated components, but also achieves a synergistic effect where one system can improve the performance of the other.

Figure 1:
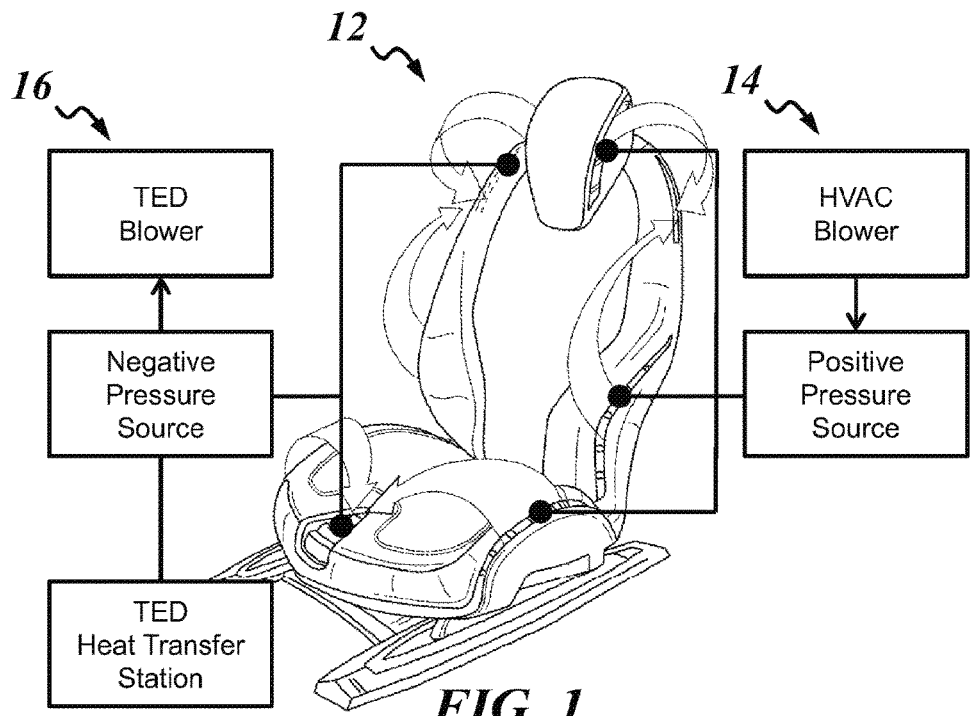
FIG. 1 illustrates one embodiment of an occupant thermal comfort system for use with a vehicle seat.
Figure 2:
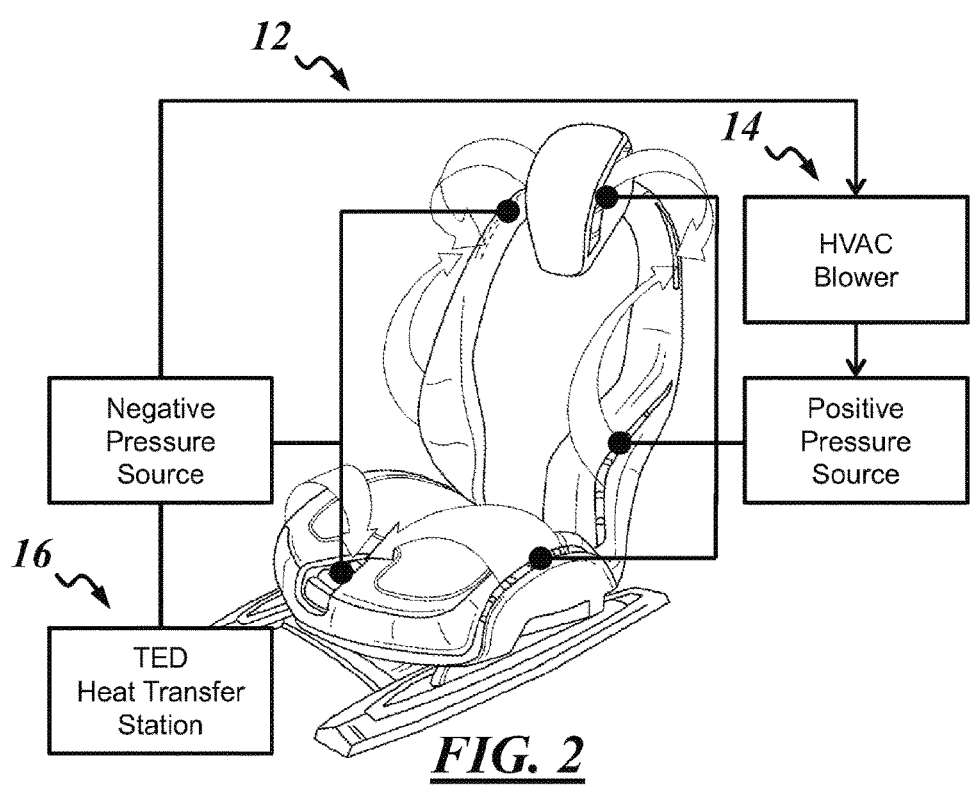
FIG. 2 illustrates another embodiment of the occupant thermal comfort system.

With reference to FIGS. 1 and 2, there is shown a vehicle seat 10 equipped with at least some components of the occupant thermal comfort system 12, also abbreviated herein as comfort system 12. The comfort system 12 includes an airflow management system 14 and a thermal-electric device (TED) system 16. The airflow management system 14 is configured to manage the thermal comfort of a seat occupant by providing air flow at desired conditions (e.g., temperature, flow rate, humidity, etc.) in the immediate vicinity of the seat occupant via one or more air flow ports 26, 28 installed in the vehicle seat 10. Exemplary airflow patterns are indicated as 3D arrows in FIGS. 1 and 2. The TED system 16 is configured to provide warming or cooling sensations to the seat occupant by conducting thermal energy to or from the seat occupant. The airflow management system 14 and the TED system 16 may share one or more components of the comfort system 12 as shown and as described in further detail below.

In the illustrated examples, heated or cooled air from an HVAC system 35 of the vehicle is routed to internal air flow channels in the vehicle seat 10 and discharged in the immediate vicinity of the seat occupant under positive pressure from an HVAC blower 34. The conditioned air is discharged through air discharge ports 28 located around a passenger seating area where the seat occupant is seated. A negative pressure source 30 also draws air into air intake ports 26 located around the passenger seating area, causing at least some of the conditioned air to flow along the body of the seat occupant on its way to the air intake ports 26. In the embodiment of FIG. 1, the negative pressure source 30 is a low pressure side of a TED system blower 34', which is also used to heat or cool certain TED components within the seat. Thus, air that has already been heated or cooled by the HVAC system 35 can be drawn into the TED system 16 to enhance TED performance. In the embodiment of FIG. 2, the negative pressure source 30 is a low pressure side of the HVAC blower 34 so that conditioned air surrounding the seat occupant is drawn through the TED system 16 via the air intake ports 26 and recirculated to the HVAC system 35.

Figure 3:
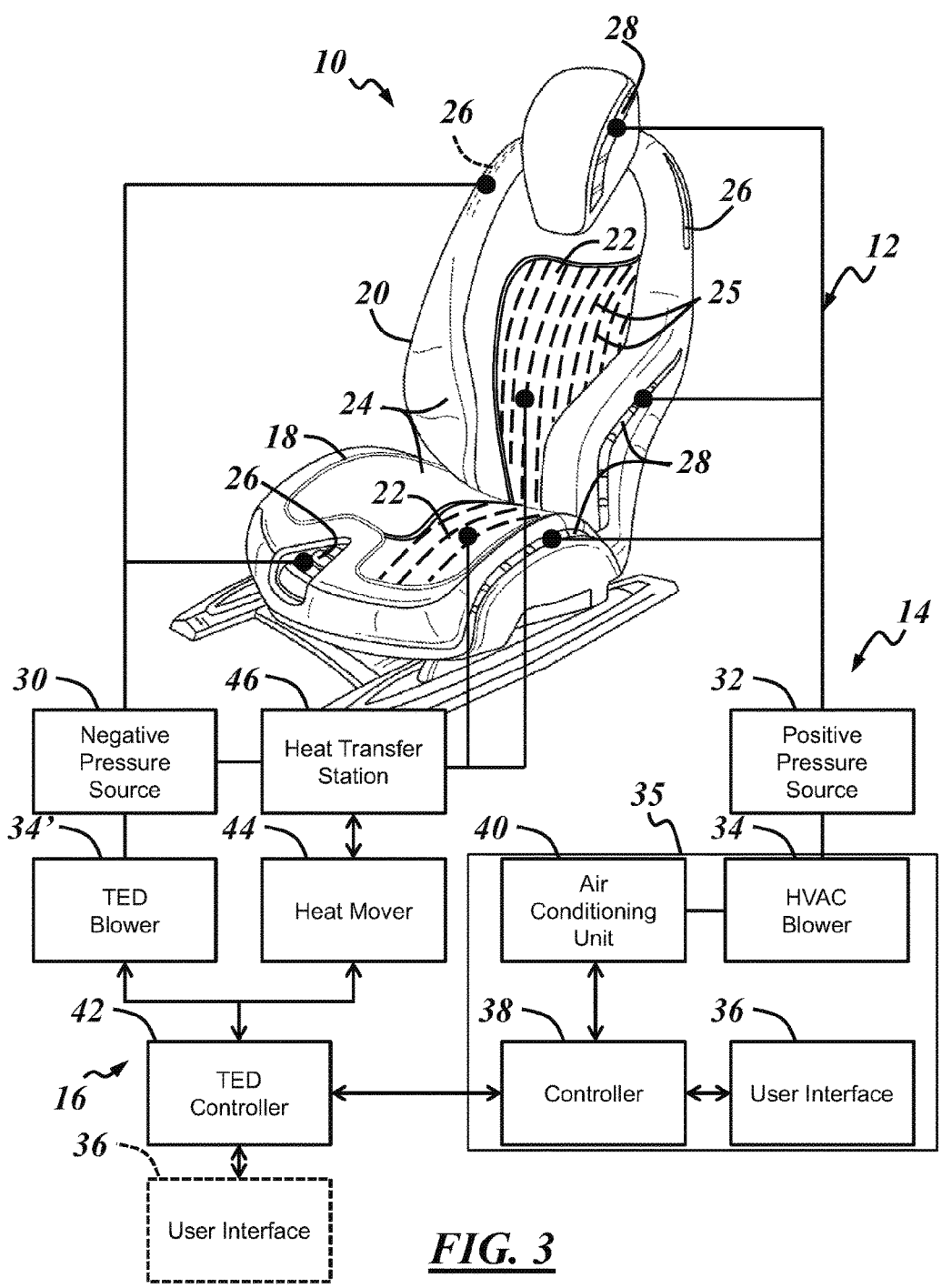
FIG. 3 is a cut-away view of the vehicle seat of FIG. 1, including components of the thermal comfort system.
Figure 4:
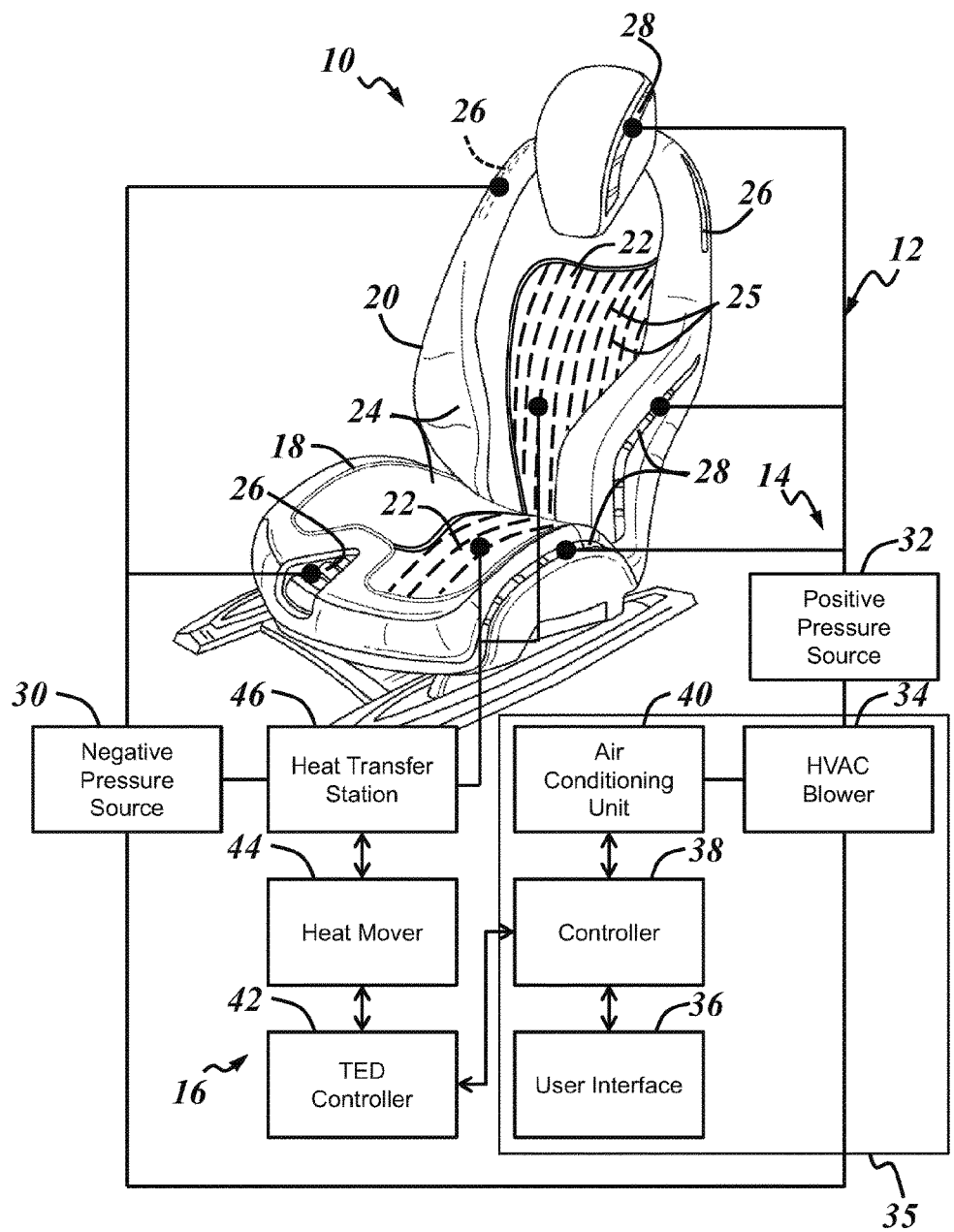
FIG. 4 is a cut-away view of the vehicle seat of FIG. 2, including components of the thermal comfort system.

With reference to FIGS. 3 and 4, the illustrated vehicle seat 10 includes a seat bottom 18 adapted to be coupled to a vehicle floor and a seat back 20 coupled with and extending from the seat bottom 18. Each of the seat bottom 18 and the seat back 20 may also be referred to as an occupant support, as each is configured to support at least a portion of the weight of the seat occupant, along with other forces applied to the vehicle seat 10 by the seat occupant during vehicle operation. Each occupant support 18, 20 may be configured for various adjustments (e.g., tilting, pivoting, sliding, folding, etc.) to accommodate different-sized or different preferences of seat occupants. Each of the occupant supports 18, 20 may also include an internal frame or other structure not visible in FIG. 3. Each of the illustrated occupant supports 18, 20 includes a cushion 22 and a covering 24. Each cushion 22 includes one or more foam layers that help define the overall shape of the vehicle seat 10. The cushions 22 can help the vehicle seat 10 conform to the shape and size of the seat occupant to provide a comfortable feel and are supported by underlying structural components. In the illustrated example, each cushion 22 is coupled with one or more components of the TED system 16, including a thermal-electric device (TED) 25, as described in further detail below. The coverings 24 overlie the cushions 22 and may be provided for decorative purposes and/or to impart the seating surface of the vehicle seat with long-term wear and durability.

The illustrated airflow management system 14 includes one or more air flow ports 26, 28 built-in to the vehicle seat 10. Each air flow port 26, 28 is adapted for fluid connection with a pressure source 30, 32 that serves to cause air to flow in the desired direction through the associated air flow port 26, 28. This is shown schematically in FIG. 3. Each air intake port 26 is adapted for fluid connection with a negative pressure source 30 having a fluid pressure lower than an ambient pressure of a cabin of the vehicle. When connected with the negative pressure source 30, air from the cabin of the vehicle flows into and through the associated air intake port(s) 26 toward the negative pressure source 30. Each air discharge port 28 is adapted for fluid connection with a positive pressure source 32 having a fluid pressure higher than the ambient pressure of the cabin of the vehicle. When connected with the positive pressure source 32, air flows through and out of the associated air discharge port(s) 28 and into the cabin of the vehicle away from the positive pressure source 32. The fluid connection between the pressure sources 30, 32 and air flow ports 26, 28 may include conduits, ductwork or other cavities internal to the vehicle seat 10. The air flow ports 26, 28 and the pressure sources 30, 32 may also be fluidly connected as least partly by ductwork external to the vehicle seat 10.

Each pressure source 30, 32 can be located within and/or included as part of the vehicle seat 10, or each pressure source 30, 32 can be separate from the vehicle seat 10. Each air flow port 26, 28 can have a dedicated pressure source 30, 32, or each pressure source 30, 32 can be fluidly connected with more than one air flow port 26, 28. A fan or blower 34, 34' provide one or both of the pressure sources 30, 32. The low pressure side or upstream side of the blower 34, 34' may be the negative pressure source 30, while the high pressure side or downstream side of the same blower 34, 34' or of a different blower 34, 34' may be the positive pressure source 32. In the example of FIGS. 1 and 3, the HVAC blower 34 provides the positive pressure source 32, and a TED system blower 34' provides the negative pressure source 30. In the example of FIGS. 2 and 4, the HVAC blower 34 provides both the negative pressure source 30 and the positive pressure source 32—i.e., air drawn into the vehicle seat 10 via the air intake ports 26 is routed back to the HVAC system 35 of the vehicle. Other configurations are possible, and the blower(s) 34, 34' can be located either internally or externally located with respect to the vehicle seat 10.

Other components of the airflow management system 14 shown schematically in FIGS. 3 and 4 include a user interface 36, a controller 38, and an air conditioning unit 40, all of which are part of the HVAC system 35 of the vehicle in this example. The user interface 36 is any component with which the seat occupant or other person interacts to affect change in the comfort system 12. The user interface 36 may include switches, dials, push buttons, levers, a touch screen, a microphone, a sensor, or any other suitable device. The user interface 36 receives information in the form of user input(s) with respect to the type of thermal comfort desired and communicates the information to the controller 38. The controller 38 is in communication with various other system components and controls the operation of each component and/or receives feedback or other information from each component. In the illustrated comfort system 12, the user interface 36 communicates with the TED system 16 via the controller 38. More specifically, the controller 38 receives information from the user interface 36 and controls the TED system 16 through communication with a TED controller 42 based at least partly on the received information. In another embodiment, shown in dashed lines in FIG. 3, the user interface 36' communicates directly with the TED controller 42. The user interface 36' can be provided by the HVAC system 35, or it can be provided separately, such as in the form of an on/off switch installed in the vehicle seat 10 or any other suitable interface.

In other examples, each of the airflow management system 14 and the TED system 16 may include one or more dedicated user interfaces 36 and/or controllers 38, or the user interface 36 and/or the controller 38 may be shared by other systems of the vehicle or separate from the HVAC system 35. The HVAC controller 38 and/or the user interface 36 may be in communication with one or more components of the comfort system 12 over a vehicle communication bus (e.g., LIN, CAN, or proprietary bus). In another embodiment, where the vehicle includes more than one vehicle seat 10, each vehicle seat 10 has a dedicated user interface 36 that is either integrated with the HVAC system 35 or integrated with the individual vehicle seat 10. The ability of the comfort system 12 to share components such as controllers 38 and user interfaces 36 among its sub-systems and/or with other systems of the vehicle can help reduce cost, energy consumption, and redundancy.

The air conditioning (A/C) unit 40 may include an air heater and/or an air cooler. In this example, the A/C unit 40 is part of the HVAC system 35, which includes an air heater and an air cooler, but the airflow management system 14 could have a dedicated air heater and/or air cooler located internally or externally with respect to the vehicle seat 10. The A/C unit 40 may include one or more heat exchangers that heat or cool air flowing along the airflow management system 14 and the comfort system 12. Conditioned air may be routed to more than one vehicle seat 10 via a manifold where the A/C unit 40 is separate from the vehicle seat 10.

The illustrated TED system 16 of FIGS. 3 and 4 also includes a heat mover 44 and a heat transfer station 46. The heat mover 44 is operable to provide a temperature gradient in the TED 25 to induce a flow of thermal energy a desired direction between the seating surface of the vehicle seat 10 and the heat transfer station 46, which may be located inside the vehicle seat 10. Air or some other heat transfer medium at the heat transfer station 46 imparts thermal energy to or extracts thermal energy from the TED 25 at a location spaced away from the seating surface. The negative pressure source 30, provided by the TED system blower 34' in FIG. 3 and by the HVAC blower in FIG. 4, is in fluid communication with the heat transfer station 46 to provide a flow of air as the heat transfer medium. Operation of the TED system 16 is described in greater detail below.

Figure 5:
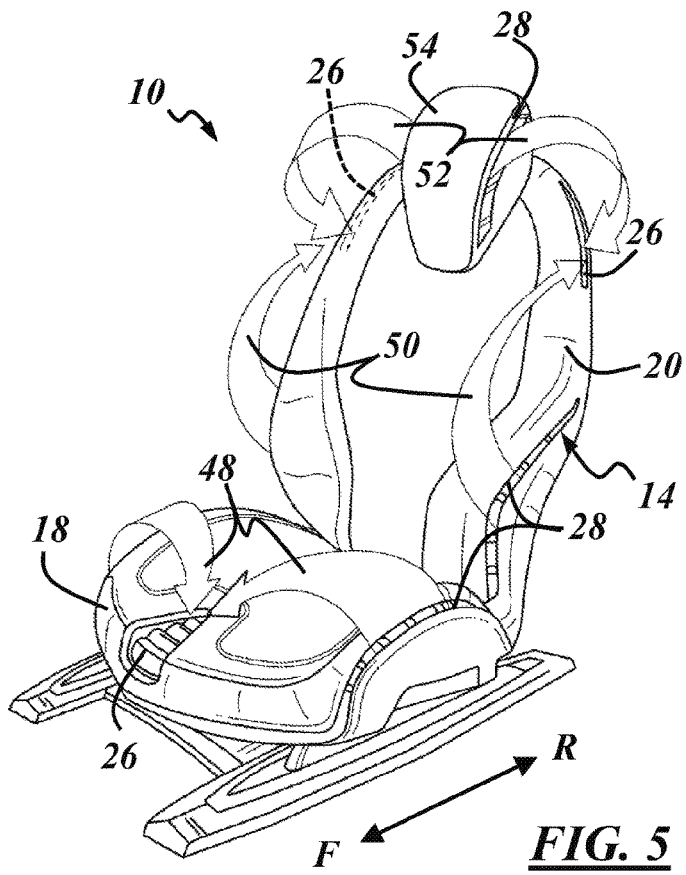
FIG. 5 illustrates the vehicle seat of FIGS. 1 and 2 with air flow paths illustrated between air intake and discharge ports.

Operation of the airflow management system 14 is illustrated in FIG. 5. The airflow ports 26, 28 are configured and arranged along the vehicle seat 10 to result in various air flow paths or air streams 48-52 that flow along the body of the seat occupant. In FIG. 5 the front (F) and rear (R) directions are designated by the double arrow. In this example, one air intake port 26 is centrally located along a front side of the seat bottom 18, and additional air intake ports 26 are located on each of the opposite left and right sides of the seat back 20 near the top of the seat back 20. Air discharge ports 28 are located on opposite left and right sides of the seat bottom 18, on opposite left and right sides of a lower portion of the seat back 20, and on opposite left and right sides of a headrest portion 54 of the seat back 20. Lower airstreams 48 are thereby created by the air flowing from the air discharge ports 28 along the left and right sides of the seat bottom 18 and toward the air intake port 26 at the front side of the seat bottom 18. The lower air streams 48 may thus flow over and/or along the hips and thighs of the seat occupant. Medial air streams 50 may flow along the torso of the seat occupant as air flows from the air discharge ports 28 at the lower portion of the seat back 20 and toward the air intake ports 26 at the upper portion of the seat back 20. Upper air streams 52 may flow along the head, neck, and/or shoulders of the seat occupant as air flows from the air discharge ports 28 at the headrest 54 and toward the air intake ports 26 along the seat back 20.

The air streams 48-52 do not necessarily represent discrete streams of air in which all, or even most, of the same air discharged at the air discharge port 28 at one end of the air stream is received by the air intake port 26 at an opposite end of the air stream. Rather, they represent the general direction of convection currents surrounding the seat occupant. The configuration of the airflow management system 14 in the figures is merely illustrative. The airflow management system 14 may include only a single air flow port 26, 28 and only one pressure source 30, 32. In one embodiment, all of the air flow ports 26, 28 that are arranged to provide air flow along the body of the seat occupant are air discharge ports 28 fluidly connected with one or more positive pressure source(s) 32, such as the HVAC blower 34, external to the vehicle seat 10. In another embodiment, the comfort system 12 includes at least one air intake port 26. Air intake ports 26 can help guide or bend the streams of air discharged at the air discharge port(s) 28 so that they flow along the body of the seat occupant. The direction of the air streams 48-52 may also depend partly on other factors, such as the temperature of the discharged air and/or the configuration of vanes, grilles, or other flow directors located at each air flow port 26, 28.

Figure 6:
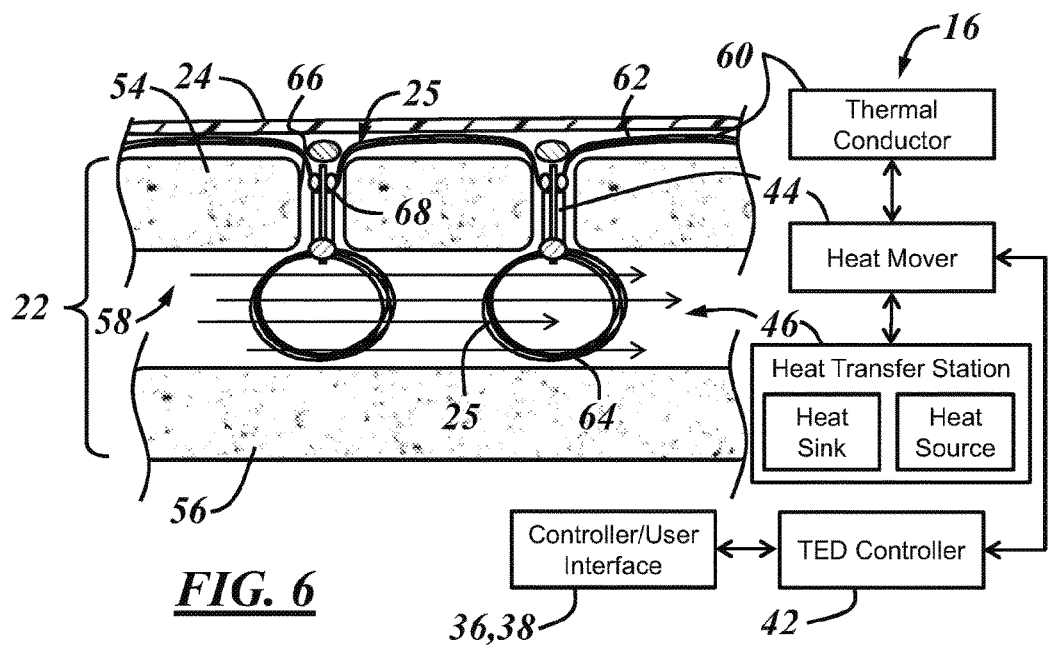
FIG. 6 is a partial cross-sectional view of a seat component with a thermal-electric device (TED) installed therein.

FIG. 6 is a schematic partial cross-section of an exemplary TED system 16 and illustrates the basic operation of the TED system 16. The TED system 16 is installed as part of the seat cushion 22 in this example, which may be included as part of the seat bottom 18 and/or the seat back 20, and underlies the covering 24. The illustrated seat cushion 22 includes multiple layers, including an outer layer 54 nearest the seating surface, an inner layer 56 farthest from the seating surface, and a middle layer 58 located between the outer layer 54 and the inner layer 56. In this example, the cross-section is taken through a portion of the cushion 22 where an air cavity or gap is present at the middle layer 58. The middle layer 58 may include a reticulated foam material, a mesh- or net-like material, or some other air-permeable material that allows air to freely flow therethrough. The TED system 16 includes the TED 25, which comprises a thermal conductor 60. The TED 25 is configured to accommodate thermal energy flow to and from the seat occupant by thermal conduction at the seating surface. Some radiant heat transfer may also occur. The covering 24 may be non-porous or non-perforated so that air cannot flow through the covering 24.

When the TED system 16 is in a heating mode, the heat mover 44 operates to cause thermal energy to flow along the thermal conductor 60, which may be a braid or bundle of electrically and thermally conductive wires, in a direction from the heat transfer station 46 and toward the seat occupant. More specifically, the thermal conductor 60 transfers thermal energy toward outer heat transfer nodes 62, which are in contact with an inner surface of the covering 24, and away from inner heat transfer nodes 64, which are located within the seat cushion 22 and in contact with a heat transfer medium as a heat sink or heat source. Thermal energy is conducted to the body of the seat occupant through the covering 24.

When the TED system 16 is in a cooling mode, the heat mover 44 operates to cause thermal energy to flow along the thermal conductor 60 in a direction toward the heat transfer station 46 and away from the seat occupant. More specifically, the thermal conductor 60 transfers thermal energy away from the outer heat transfer nodes 62, which are in contact with the inner surface of the covering 24, and toward the inner heat transfer nodes 64. Thermal energy is conducted away from the body of the seat occupant through the covering 24. In this example, the heat transfer medium is air flowing through the middle layer 58. The air acts as a heat sink, extracting heat from the conductor 60 at the inner heat transfer nodes 64. Air flow is indicated by the left-to-right horizontal arrows at the middle layer 58 and is provided to extract thermal energy from the inner heat transfer nodes 64 in the cooling mode. Air flow is not required at the heat transfer station 46 in the heating mode, but it can optionally be provided. Other heat sources and heat sinks are possible, and they may be separately located and/or separately controllable. The inner heat transfer nodes 64 are located at the heat transfer station 46 within the middle layer 58 of the seat cushion 22 in this example.

As illustrated, the thermal conductor 60 may weave its way into and out of through-holes 66 formed in the outer layer 54 of the seat cushion 22. The portion of the thermal conductor 60 that extends through each of the through-holes 66 may be referred to as a heat pipe 68 that is capable of moving thermal energy from one side of the outer layer 54 to the other, opposite side of the outer layer 54. The heat movers 44 operate by establishing a temperature gradient (e.g., about 10° C.) along the thermal conductor 60. The heat movers 44 in this example are in communication with and operated by the TED controller 42 based at least partially on information received via the user interface 36 and/or the controller 38 of the airflow management system. In one embodiment, the heat mover 44 is a TED microchip (available from Tempronics, Tucson, Ariz.). The following publications may be referenced for further information on the operation of TED microchips: U.S. patent application publication numbers 2009/0205695, 2012/0060885, 2011/0226299, and 2013/0008181; an WIPO publication numbers WO/2012/037031 and WO/2013/006640. Each occupant support 18, 20 of the vehicle seat 10 may include more than one TED and/or each TED can be configured for independent control.

When integrated with the airflow management system 14 as part of the comfort system 12, air that has already been conditioned by the airflow management system 14 can be made available at the heat transfer station 46 to advantageously affect thermal energy flow in the thermal conductor 60. For example, when the seat occupant indicates via the user interface 36 that a cooler environment is desired, the airflow management system 14 operates to discharge cool air from the air discharge ports 28 of the vehicle seat 10, as shown in FIG. 5, and to draw at least some of the discharged air back into the vehicle seat 10 through the air intake ports 26. Also, the TED system 16 may enter cooling mode, where the heat movers 44 operate to provide a thermal gradient in the TED 25 that conducts heat away from the seat occupant and toward the heat transfer station 46. Routing the air from the air intake ports 26, which is cooler air than in other portions of the cabin of the vehicle by operation of the airflow management system 14, through the heat transfer station 46 enhances the rate at which waste heat is extracted from the TED 25. Thus, the airflow management system 14 enhances the performance of the TED system 16, providing more immediate comfort to the seat occupant. Routing air that has been heated by the airflow management system 14 through the heat transfer station 46 may also enhance the performance to the TED system 16 in heating mode.

Figure 7:
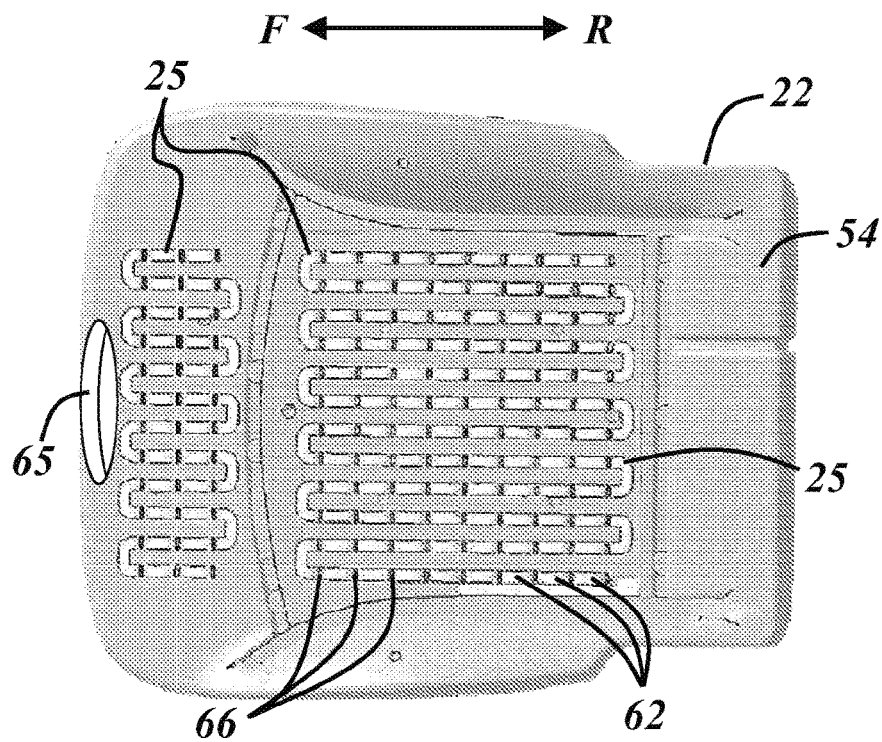
FIG. 7 is a top view of an embodiment of a seat bottom cushion with the covering removed to show one side of an integrated TED.

FIG. 7 is a top view of an embodiment of the seat cushion 22 of the seat bottom 18 with no decorative covering 24. The top surface of the seat cushion 22 is visible in this view, along with a portion of two TEDs 25 coupled therewith. The outer heat transfer nodes 62 of the thermal conductors 60 lie along the top surface of the seat cushion 22 between adjacent through-holes 66 formed through the seat cushion 22. Sets of through-holes 66 are arranged in an array for placement of the outer heat transfer nodes 62 in a pattern. Each array of outer heat transfer nodes 62 is arranged in a serpentine pattern, with multiple rows of outer heat transfer nodes 62 oriented parallel with the front-to-rear direction (or vehicle lengthwise direction) and an outer heat transfer nodes 62 at one end of each row connecting adjacent rows. The illustrated seat cushion 22 and TEDs 25 are integrated, meaning that the seat cushion 22 and/or the various layers 54-58 of the seat cushion 22 specifically designed to accommodate the TEDs 25. In this example, the seat cushion 22 is molded as one piece and shaped to accommodate and fit the TEDs 25. In other embodiments, the TED 25 can be fitted to an existing seat cushion 22 by integrating the TED 25 with one or more separate cushion or foam layers for insertion into a cavity or hollowed-out portion of the existing seat cushion 22. Also shown in FIG. 7 is an intake passage 65 formed through the seat cushion 22 located and configured to be in fluid communication with one of the air intake ports 26, such as the centrally located air intake port 26 in the seat bottom 18 of FIG. 5.

Figure 8:
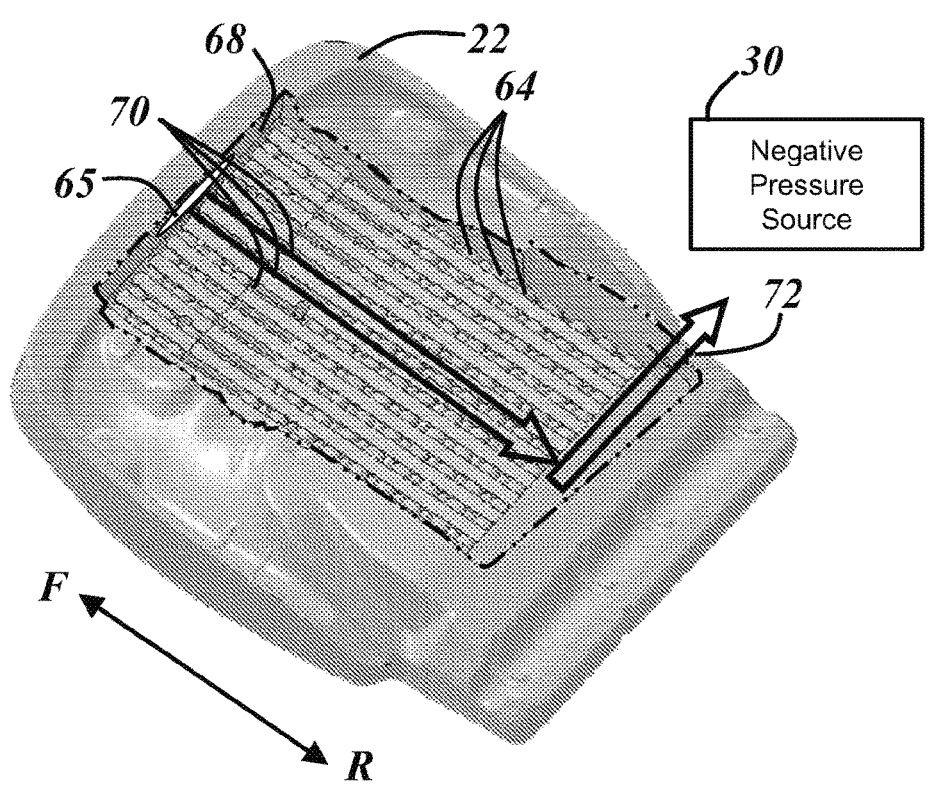
FIG. 8 is a bottom perspective view of the cushion of FIG. 7 showing the opposite side of the TED.

FIG. 8 is a perspective view of the bottom side of the seat cushion 22 of FIG. 7. In this view, the inner heat transfer nodes 64 of the thermal conductor 60 are visible. A cavity or recess 68, outlined in FIG. 8 with a phantom line for clarity, is formed in the bottom side of the seat cushion 22. A plurality of channels 70 are formed in the seat cushion 22 at the bottom of the recess 68, extending in the front-to-rear direction and located on the opposite side of the seat cushion 22 directly opposite the outer heat transfer nodes 62 shown in FIG. 7. The inner heat transfer nodes 64 are located within the channels 70, and a row of inner heat transfer nodes 64 is positioned in each channel 70. The recess 68 is sized and shaped for an insert (omitted in FIG. 8) that accommodates airflow from the intake passage 65 toward an exhaust passage 72 in the general direction of the arrows. Exhaust passage 72 is adapted to be coupled with the negative pressure source 30. In one embodiment, a reticulated foam insert fits into the recess 68 and is configured to accommodate free flowing air therethrough from the intake passage 65 to the exhaust passage 72. Other channels 70 may be formed in the seat cushion 22 as well, for ventilation and/or forced air flow.

Figure 9:
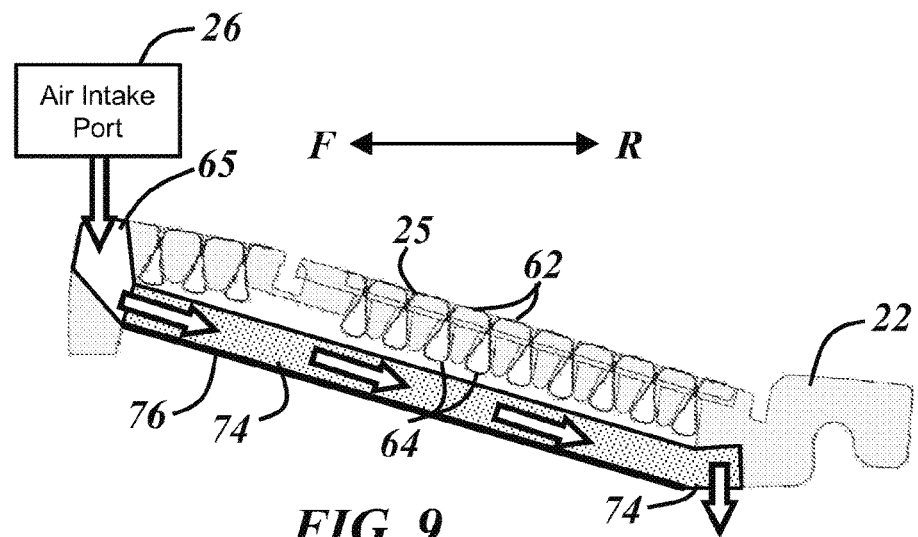
FIG. 9 is a cross-sectional side view of a seat bottom with a TED installed therein.

FIG. 9 is a cross-sectional side view of the seat cushion 22 of FIGS. 7 and 8 with an insert 74 fitted into the recess 68. The insert 74 may be a reticulated foam insert or some other type of insert that allows air to flow freely through the insert 74. A front edge of the insert 74 is placed in fluid communication with the cabin of the vehicle in the vicinity of the seat occupant via the air intake port 26 and the intake passage 65. Under the influence of the negative pressure source 30, air flows through the intake passage 65 and the insert 74 from the front of the seat cushion 22 and toward the rear of the seat cushion 22 and the exhaust passage 72. The insert 74 and the air flowing therethrough acts as a heat sink during the cooling mode of the TED system 16 and may act as a heat source during the heating mode, enhancing the performance of the TED 25. The insert 74 has an impermeable layer 76 along a bottom surface to prevent air from flowing out of the insert 74 on its way to the exhaust passage 72. The impermeable layer 76 may be a film, a layer of fabric, a plastic panel, or other suitable layer. The upper surface of the insert 74 may also have an impermeable layer 76 and/or the inner heat transfer nodes 64 of the TED 25 may extend partially into the insert 74 for better airflow contact with the TED. In one embodiment, the insert 74 is a piece of air-permeable material sealed in a plastic bag that has openings formed in it to allow air to flow into and out of the insert 74 at the desired locations. In that case, the plastic bag may be perforated along the upper surface of the insert 74 to allow the inner heat transfer nodes 64 to extend into the insert 74. A bottom closure, such as another foam layer, a seat pan, a panel, or a covering may be included beneath the insert 74. This is of course only one example of the manner in which air flow from the airflow management system 14 can be routed along components of the TED system 16. Though the illustrated example is the seat cushion 22 of the seat bottom 18, the description is applicable to the seat back 20 as well.

Figure 10:
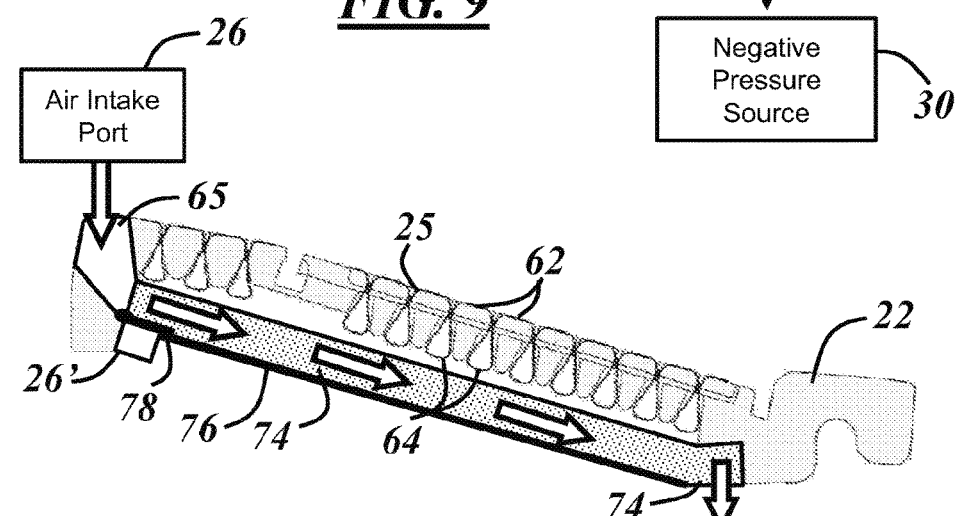
FIG. 10 is a cross-sectional side view of another embodiment of the seat bottom, including a flapper valve.
Figure 11:
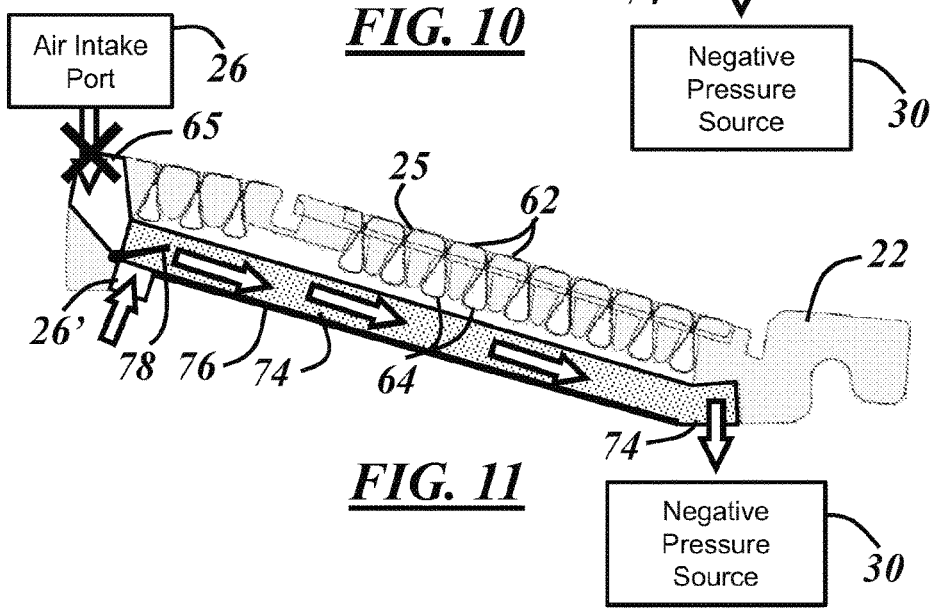
FIG. 11 shows the seat bottom of FIG. 10 with the flapper valve actuated.

FIGS. 10 and 11 illustrate another embodiment including a valve 76 that is operable to change the location at which air is received into the insert 74 under certain conditions. The illustrated valve 78 is a flapper valve. Under normal operating conditions, the valve 78 is in the position shown in FIG. 10, with gravity biasing the valve 78 in a position that allows air flow from the air intake port 26 through the intake passage 65 and into the insert 74. In the position illustrated in FIG. 10, the valve 78 also blocks air flow between the insert 74 and a secondary air intake port 26'. In cases where the air intake port 26 is blocked by the seat occupant, such as by an article of clothing, a towel or other passenger cargo, as shown in FIG. 11, the valve 78 actuates to allow air flow into the insert 74 via the secondary intake port 26' under operation of the negative pressure source 30. A partially blocked air intake port 26 may cause the valve 78 to partially open. This arrangement can prevent the interruption of airflow through the TED system 16 and may also prevent the negative pressure source 30 from being overtaxed.

Other configurations are possible for the comfort system 12. For example, air may flow through the heat transfer station 46 of the TED system 16 under the influence of a positive pressure source 32 and/or heated or cooled air may be routed through the TED system 16 before being discharged in the vicinity of the seat occupant.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle seat, comprising:
   a seat bottom and a seat back coupled together, each having a seating surface that makes contact with a seat occupant;
   at least one air flow port adapted for fluid connection with a non-ambient pressure source that induces air flow through the port and along the body of the seat occupant; and
   a thermal-electric device (TED) comprising an inner heat transfer node and an outer heat transfer node, the TED being operable to establish a temperature gradient between the inner and outer heat transfer nodes,
   wherein the TED is arranged so that thermal energy is transferred by thermal conduction between the outer heat transfer node of the TED and the seat occupant through the seating surface(s), and so that additional thermal energy is transferred between the induced air flow and the inner heat transfer node.

2. A vehicle seat as defined in claim 1, further comprising:
   an internal air flow channel, wherein at least one air flow port is an air intake port adapted for fluid connection with a negative pressure source that induces air flow from the vehicle cabin and along the internal air flow channel via the air intake port.

3. A vehicle seat as defined in claim 1, further comprising:
   a heat transfer station in communication with the TED, wherein at least one air flow port is in fluid communication with the heat transfer station.

4. A vehicle seat as defined in claim 3, wherein at least one air flow port is an air intake port adapted for fluid connection with a negative pressure source that induces air flow along the heat transfer station.

5. A vehicle seat as defined in claim 1, wherein the non-ambient pressure source is provided by a vehicle HVAC system.

6. A vehicle seat as defined in claim 1, wherein the non-ambient pressure source is provided by a TED system.

7. A vehicle seat as defined in claim 1, further comprising:
   a blower that provides the non-ambient pressure source.

8. A vehicle seat as defined in claim 1, further comprising:
   a valve operable to allow or prevent air flow through at least one of the air flow ports when another air flow port is at least partially blocked.

9. A vehicle seat as defined in claim 1, wherein a portion of the TED is in thermal communication with a layer of air-permeable material within the seat back or the seat bottom or both, and the air-permeable material is in fluid communication with the non-ambient pressure source.

10. A thermal comfort system for use with a vehicle seat, comprising:
an airflow management system arranged to discharge air from one or more air discharge ports located along a passenger seating area of the vehicle seat so that the discharged air flows along the body of a seat occupant, wherein characteristics of the discharged air are changeable according to user input; and
a thermal-electric device (TED) system comprising a TED and being arranged to conduct thermal energy between the vehicle seat and the seat occupant,
wherein the thermal energy is transferred between the TED and the seat occupant by thermal conduction.

11. A thermal comfort system as defined in claim 10, further comprising:
a common non-ambient pressure source that induces air flow along at least a portion of both of the airflow management system and the TED system during operation.

12. A thermal comfort system as defined in claim 10, wherein the TED is located so that air flows along the TED during operation.

13. A thermal comfort system as defined in claim 10, further comprising:
a controller in communication with at least one component of both of the airflow management system and the TED system; and
a user interface in communication with the controller and operable to receive user input that affects operating characteristics of both of the airflow management system and the TED system.

14. A thermal comfort system as defined in claim 10, wherein a vehicle HVAC system supplies conditioned air to the vehicle seat.

15. A thermal comfort system as defined in claim 10, wherein air from the vehicle seat is supplied to a vehicle HVAC system along a recirculation path.

16. A vehicle seat having a seating surface that makes contact with a seat occupant, the vehicle seat comprising:
an air intake port located along a passenger seating area of the vehicle seat;
an internal air flow channel interconnecting the air intake port with a negative pressure source so that air flows from the vehicle cabin, along the body of the seat occupant, through the air intake port, and along the internal air flow channel; and
a thermal-electric device (TED) operable to establish a temperature gradient between opposite first and second sides, the TED being arranged so that thermal energy is transferred by thermal conduction between the first side of the TED and the seat occupant through the seating surface and so that additional thermal energy is transferred between the second side of the TED and the air that flows along the internal air flow channel.

17. A vehicle seat as defined in claim 16, further comprising an air discharge port located along the passenger seating area such that conditioned air is discharged from inside the vehicle seat via the air discharge port to form an air stream that flows along the body of the seat occupant and before being drawn into the internal air flow channel via the air intake port, whereby said additional thermal energy is transferred between the second side of the TED and the conditioned air.

18. A vehicle seat as defined in claim 17, wherein the conditioned air is conditioned by a heat exchanger that is separate from the vehicle seat before being discharged via the air discharge port.

19. A vehicle seat as defined in claim 18, wherein the heat exchanger is part of a vehicle HVAC system comprising a blower that is external to the vehicle seat, and wherein the conditioned air is routed to the vehicle seat and discharged via the discharge port under positive pressure from the blower.

20. A vehicle seat as defined in claim 19, wherein the negative pressure source is a low pressure side of the blower so that conditioned air surrounding the seat occupant is drawn through the internal air flow channel via the air intake port and recirculated to the vehicle HVAC system.

* * * * *